United States Patent [19]
MacManus

[11] 3,760,745
[45] Sept. 25, 1973

[54] TURNTABLE DEVICE
[76] Inventor: John MacManus, 143-16 Twenty-Second Rd., Whitestone, N.Y. 11357
[22] Filed: Mar. 27, 1972
[21] Appl. No.: 238,356

Related U.S. Application Data
[63] Continuation-in-part of Ser. No. 68,103, Aug. 31, 1970, Pat. No. 3,724,417.

[30] Foreign Application Priority Data
Apr. 2, 1971 Great Britain...................... 8530/71

[52] U.S. Cl.................................. 108/139, 108/94
[51] Int. Cl............................................. A47b 11/00
[58] Field of Search..................... 108/94, 138, 142; 118/500, 18

[56] References Cited
UNITED STATES PATENTS
2,193,147 3/1940 Stricker............................. 108/138
2,494,242 1/1950 Hardy................................. 108/139
3,155,383 11/1964 Whitmore............................. 269/58
3,631,242 12/1971 Williams............................. 250/55
3,653,340 4/1972 Bugg.................................. 108/139
2,708,899 5/1955 Rudolph............................. 118/500

Primary Examiner—James T. McCall
Assistant Examiner—Glenn O. Finch
Attorney—Robert Muir

[57] ABSTRACT

A turntable for supporting a confection is rotatably mounted about a vertical axis and is constrained by a linear guide to move to and fro in a horizontal direction. A friction wheel drives the turntable selectively in either of two modes. In one, the turntable is driven at a constant speed. In the other, the friction wheel is at an angle to produce a component which moves the turntable along the guide, and the speed of rotation of the turntable is continuously varied.

12 Claims, 4 Drawing Figures

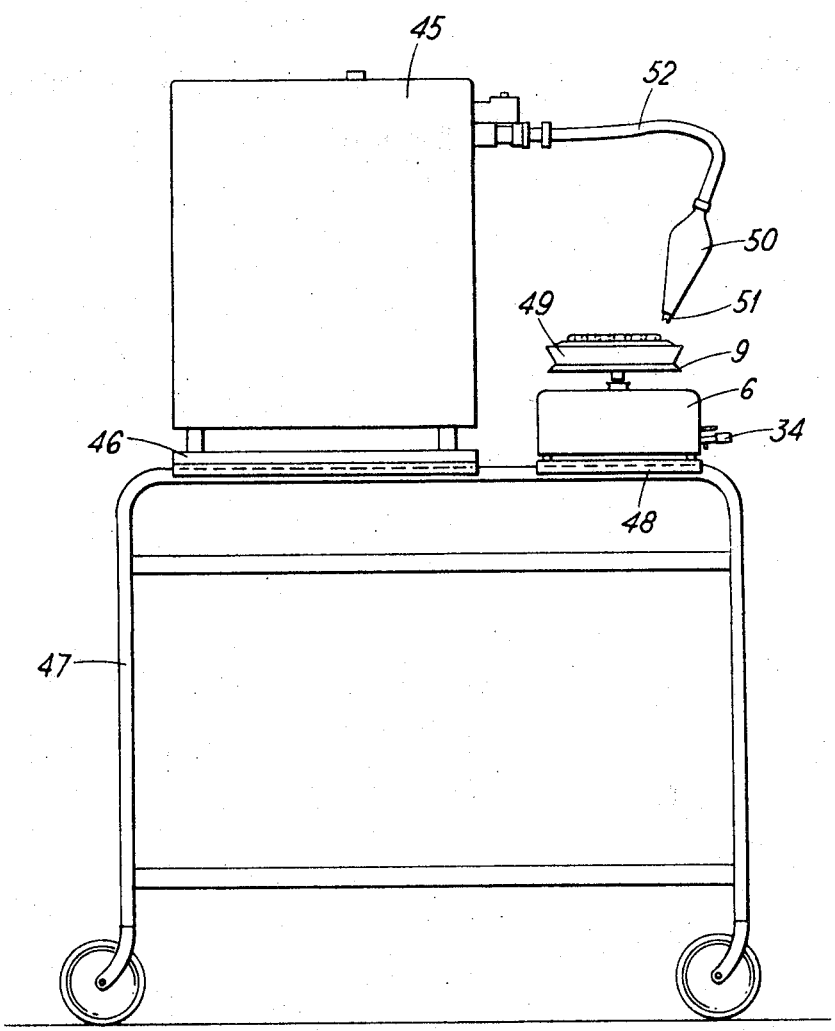

TURNTABLE DEVICE

CROSS-REFERENCE

This application is a continuation-in-part of copending U.S. Pat. application Ser. No. 68,103, filed Aug. 31, 1970, now U.S. Pat. No. 3,724,417.

In my copending U.S. Pat. application Ser. No. 68,103, now U.S. Pat. No. 3,724,417, I disclose a machine for producing whipped cream or other stiff fluent aerated emulsion food product, and preferably one of a new kind which has a pump that simultaneously draws in liquid product and air and discharges them through a static narrow orifice homogenizer, with a turntable which is arranged to support a confection and is rotatable about a vertical axis, and one or more outlet nozzles which are arranged to discharge product from the machine downwardly onto or into a confection on the turntable throughout a range of positions differently spaced from the axis of rotation of the turntable.

Using this apparatus, it is possible to deposit whipped cream or other product in concentric rings or in a spiral configuration on the surface of the confection. Naturally the product may be deposited in other designs if the turntable is held stationary or rotated intermittently.

The product will normally be extruded from an outlet nozzle at a constant rate, and if the product is to be deposited in a spiral configuration on the confection at a constant linear rate relatively to the surface of the confection, the turntable must decrease in speed of rotation as the confection is laid in the spiral configuration working radially outwardly, or vice versa. In one example described in said copending application, the turntable was rotated by pulling it manually along a fixed rack which was engaged by a pinion fixed on the turntable shaft. The necessary continual variation in the rotation of the turntable was then achieved by varying the speed at which the turntable assembly was pulled along the rack. In an alternative example described in the earlier application, the turntable was driven along the rack by driving the pinion with an electric motor and the turntable was rotated by a separate variable speed electric motor. In this case the continual variation in the speed of rotation of the turntable was achieved by varying the speed of the second motor. In both these forms of apparatus separate means, such as one of the operator's hands, had to be used to vary continuously the speed of rotation of the turntable. When this occupies one of the operator's hands, he only has one hand left for manipulating the other necessary actions and this results in inefficiency and low productivity.

In accordance with the present invention, a turntable device for use with a machine for producing whipped cream or other stiff, fluent, aerated emulsion food products, and discharging them through at least one outlet nozzle, comprises a turntable which is arranged to support a confection and which is rotatable about a vertical axis, the turntable being constrained by a linear guide to move to and fro horizontally and being driven selectively in two alternate modes, in a first one of which a friction wheel engages the underside of the turntable, or a disc coaxial and rotatable with the turntable, at a fixed radial position whereby the turntable is rotated at a constant speed without moving along the guide, and in a second one of which a friction wheel engages the underside of the turntable or disc at such an angle that a reaction is produced which moves the turntable along the guide so that the friction wheel engages the turntable and/or disc at a continuously varying radial position and the speed of rotation of the turntable proper also continuously varies.

With this arrangement, in the first mode of operation, the turntable will be rotated at a constant speed of rotation dependent upon the selected radial distance between the axis of rotation of the turntable and the point of attack of the friction wheel and turntable or disc. The actual constant speed of rotation may be changed by resetting the turntable by moving it along its guide to a selected position in which the radial distance is different, without any need to change the speed of rotation of, or the position of, the friction wheel. However in the second mode of operation the turntable will be free to move slowly along the linear guide under a component of the reaction received from the or the other friction wheel with a consequent continuous variation in the speed of rotation of the turntable. This simple automatic variation in the speed of rotation of the turntable thus occurs completely steadily and automatically and enables the operator to deposit a spiral configuration of product on a confection on the turntable evenly by working radially inwards, or preferably radially outwards, depending upon whether the speed of rotation of the turntable continuously increases or decreases respectively. The device thus provides, by means of a simple adjustment, an infinitely adjustable constant speed of rotation of the turntable for depositing concentric rings of product or for combing or other decorating designs on a confection, or a continuously varying speed of rotation for the deposit of a plain or fancy spiral configuration of product when the turntable is in translational movement right to left or vice versa.

Provision is also preferably provided for disconnecting the friction wheel or wheels and turntable or disc so that the turntable may be positioned, and preferably located in any selected position along the guide and then be turned by hand or maintained stationary for other special decorating operations. Most simply this involves provision for raising the turntable or disc out of engagement with the friction wheel or wheels.

All modes of operations can readily be produced by the use of a common friction wheel and motor. This single friction wheel may be mounted in a fixed position relatively to the linear guide so that its angle of attack on the turntable or disc always produces a reaction tending to move the turntable along the guide. In this case some abutment means must be provided for positively restraining the turntable at a selected position along the guide when the first mode of operation is required. Preferably however such positive restraint is not used and the single friction wheel and the turntable and guide are relatively adjustable such that in a first position corresponding to the first mode of operation the angle of attack between the friction wheel and turntable or disc produces no reaction tending to move the turntable along the guide and simply rotates the turntable. Such an angle of attack can be achieved for example when the axis of rotation of the friction wheel, as seen from above, lies in the vertical radial plane of the turntable parallel to the linear guide. There are other stable positions but this is considered to be the best position since it produces minimum wear on the friction wheel and the stability is maintained irrespective of slight tolerances or wear on the turntable and friction wheel. The second mode of operation can then be produced by moving the guide and turntable, and the friction wheel, relatively to one another to a second position in which the axis of the friction wheel, as seen from above, is slightly displaced from the vertical radial plane of the turntable parallel to the linear guide, and the angle of attack between the friction wheel and turntable or disc produces a reaction tending to move the turntable along the guide.

One example of a turntable device constructed in accordance with the present invention is illustrated in the accompanying drawings, in which:

FIG. 4 is a side elevation showing the turntable device in use with a cream depositing machine.

Figure 1:
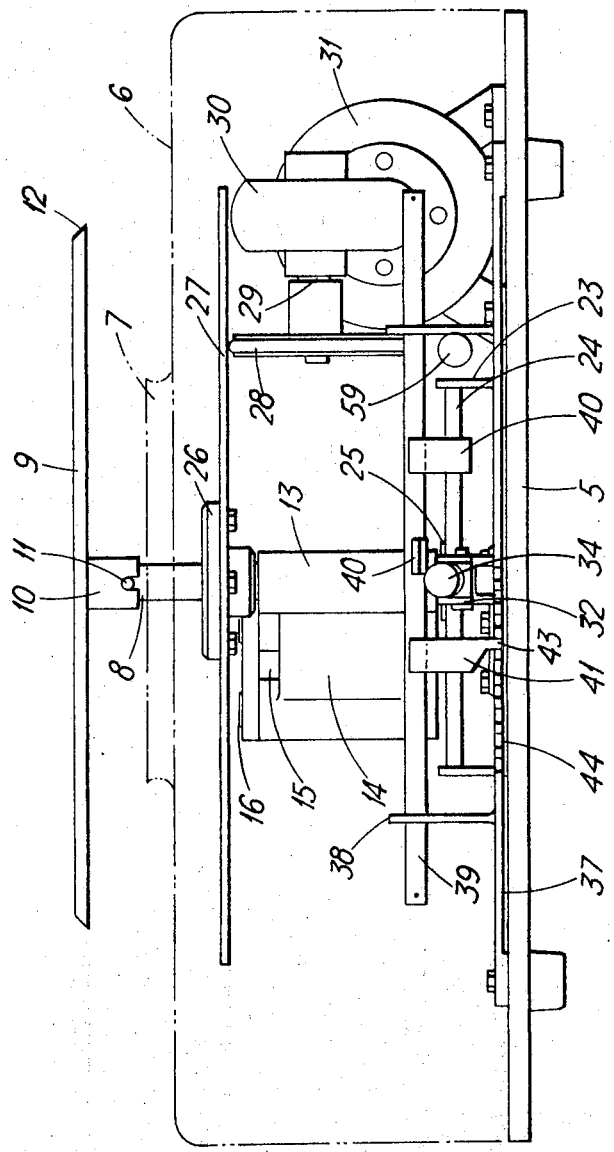
FIG. 1 is a front elevation with a casing shown transparent for clarity.

The illustrated device has a housing formed by a base plate 5 and a unitary stainless steel rectangular box cover 6 having an elongate slot in its top. The slot is formed by a peripheral upstanding lip 7 formed integrally with the cover 6. A spindle 8 extends upwards through the slot and carries on its upper end a stainless steel plate-like turntable 9 having a central bush 10 on its underside which is removably keyed to the top of the spindle by means of a stud 11 which projects laterally from the spindle and is received within a complementary recess in the bush 10. The peripheral edge 12 of the turntable is turned at inclination downwards.

The turntable spindle 8 is rotatably mounted in a sleeve bearing 13 which is supported by one end of a horizontal arm 14 the other end of which is connected to a shorter horizontal arm 15 through a vertical pivot 16 in the manner of an elbow joint, the second arm 15 being mounted through a vertical pivot 17 on a fixed support 18 carried by the base plate 5.

Figure 2:
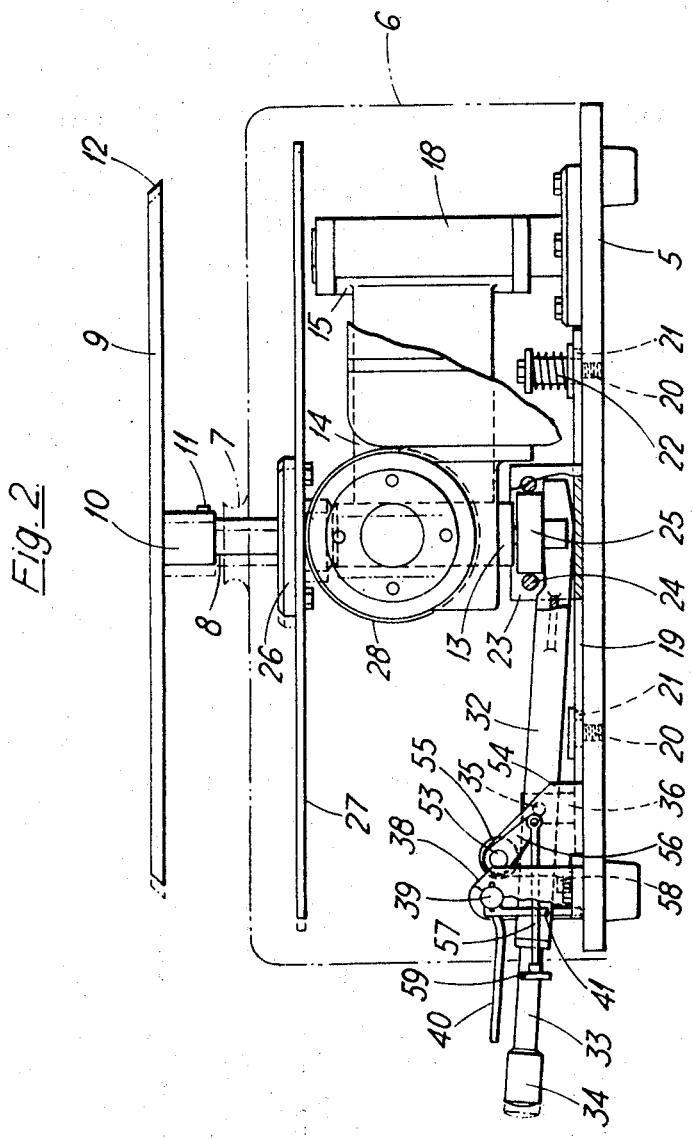
FIG. 2 is a side elevation with the casing shown transparent and with a motor shown broken away.

A cruciform-shaped carriage 19 is mounted on the base plate by means of two pins 20 which extend upwards through slots 21 to allow the carriage to be moved to and fro in a forwards and backwards direction to a limited extent relatively to the base plate. This degree of movement of the carriage and associated parts is illustrated by the difference between the solid and chain dotted lines representing the bush 10 and spindle 8 in FIG. 2, and by the arrow 8A in FIG. 3. The rear pin 20 carries a spring 22 which urges the rear of the carriage downwards.

The other arms of the carriage 19 carry a rectilinear guide formed by upstanding end plates 23 between which there extend a pair of parallel rods 24. A greaseless roller 25 which is mounted on the bottom of the spindle 8 is received within the guide between the two rods 24. As a result the turntable and spindle are free to move to and fro from side to side supported by the arms 14 and 15 to an extent limited by the length and direction of the guide. The spindle 8 also has fixed to it by means of a mounting collar 26 a circular disc 27 which is coaxial with and of slightly greater diameter than the turntable 9 and which is within the top of the housing cover. The limiting positions of the disc 27 and bush 13 when the spindle 8 is at each end of the guide is illustrated in chain dotted lines in FIG. 3 and the total stroke is shown by the arrowed line 27A.

A rubber tired friction driving wheel 28 engages the underside of the disc 27 to rotate the disc and with it the spindle 8 and turntable 9. The wheel 8 is mounted on a horizontal shaft 29 which is driven through gearing 30 from a reversible braked constant speed electric motor 31.

A control member consisting in part of a pair of parallel bars 32 and in part by a rod 33 which works in an elongate horizontal slot in the front wall of the housing cover 6 and which carries a control knob 34, is pivotally mounted by means of a pin 35 on a post 36 which itself is pivotally mounted about a vertical axis on the carriage 19. The free ends of the bars forming the part 32 extend one in each side of the bottom of the spindle 8 beneath the roller 25. The carriage and associated parts is movable to and fro in the forwards and back direction to the limit allowed by the slots 21, as indicated by the arrows 8A in FIG. 3 and the difference between the chain dotted and full line positions in FIG. 2, by pushing the knob 34 into or out of the housing. By moving the knob 34 to the right or left the control member pivots on the post 36 and carries the spindle 8 and turntable 9 to the left or right respectively along the guide. By pressing downwards on the knob 34 the control member swings about the axis of the pin 35 and the free ends of the part 32 raise the roller 25 and with it the spindle 8 and turntable 9 lifting the disc 27 out of contact with the friction wheel 28 so that the turntable can then be spun by hand.

A shaft 53, which is mounted in a bracket 54 carried by the carriage 19, carries an eccentrically drilled sleeve 55. A lever 56 is fixed to the end of the shaft 53 and is pivoted to the end of a stem 57 which projects through the slot in the casing front wall. When the stem 57 is pulled forwards the shaft 53 and sleeve 55 turn and the eccentricity of the sleeve presses down on the control rod 32 and causes it to pivot on the pin 35 to bring and hold the turntable 9 up for hand spinning. The action of the eccentric sleeve 55 is arrested when the control rod comes up against a bar 58 of the bracket 54. The control rod is then clamped between the sleeve 55 and bar 58 and is prevented from being inadvertently moved from side to side when the turntable is hand operated. It is only necessary to press the stem in again to release the control rod and lower the turntable 9 for automatic drive through the friction wheel 28. Except for a head 59 on the stem 58, these parts are, for clarity, omitted from FIG. 1.

The freedom of the control rod to move to right or left can be restricted to a limited range by means of a locating mechanism adjacent to but inside the front wall of the housing cover 6. This mechanism consists of a strip 37 which is bolted to the base plate 5 and which carries upstanding brackets 38 formed with apertures through which a rod 39 is freely slidable. The rod 39 has fixed to it a finger tab 40 which extends through the same slot in the housing cover 6 so that through which the control member extends, and two depending tabs 41 and 42. The tab 41 has a projecting finger 43 which cooperates with a rack 44 cut in the front edge of the strip 37. By raising the finger tab 40 the rod 39 is rotated to bring the finger 43 clear of the rack 44 whereupon by manipulation of the tab 40 the rod 39 and attached tabs can be moved to or fro. The assembly can then be re-located in position by releasing the tab 40 so that, under the weight of the tabs the rod 39 rotates to bring the finger 43 into one of the recesses in the rack 44 and locate the assembly axially. The tabs 40 and 41 act as abutments which are engaged by the control member as it moves to and fro and hence limits the movement of the spindle 8 along its guide.

Figure 3:
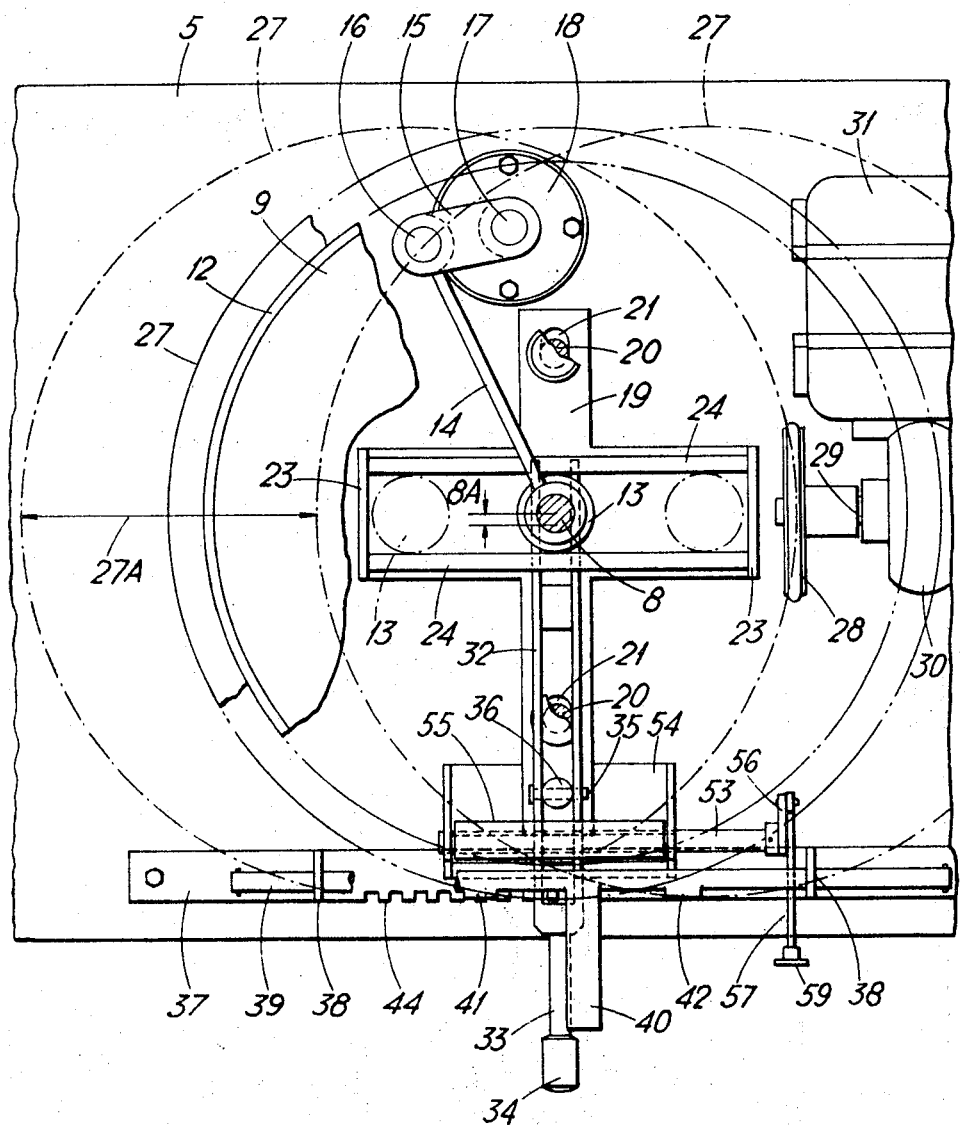
FIG. 3 is a plan with parts broken away and the casing transparent.

In the drawings the carriage and associated parts are shown in full lines in their rearward position with the pins 20 at the front ends of the slots 21. In this position the shaft 29, which is horizontal, is aligned with the longitudinal centre line of the guide and intersects the axis of the spindle 8. In this configuration the friction wheel 28 will drive the disc 27 and hence the turntable 9 at a constant speed of rotation the value of which depends on the position of the spindle 8 along its guide. Thus when the spindle 8 is at the right hand end of the guide as seen in FIG. 3, the friction wheel 28 will attack the disc 27 at a comparatively small radial distance from the spindle 8 and the turntable will be driven at a maximum speed of rotation which in this case is 60 r.p.m. The direction of rotation depends on the direction of the motor 31. By moving the control knob 34 to the right the spindle 8 is moved towards the left hand end of its guide and the speed of rotation of the turntable is infinitely adjustable down to a minimum speed of rotation which in this case is 5 r.p.m. when the spindle 8 is at the extreme left hand end of its guide and the friction wheel 28 attacks the disc 27 at a maximum radial distance. In this position of the carriage the friction wheel 28 produces no component of reaction on the disc 27 parallel to the length of the guide and consequently there is no reaction tending to move the spindle 8 along the guide and the turntable remains in one position at which it is driven at a constant speed.

The turntable may be driven in the second mode by pulling the knob 34 outwards so that the carriage moves forward. The axis of the shaft 29 will then no longer intersect that of the spindle 8. When the motor is run the friction wheel will then rotate the turntable but there will be a small component of reaction on the disc 27 and hence on the spindle 8 parallel to the length of the guide and the spindle will move slowly along the guide carrying the turntable 9 with it. As this happens the point of engagement between the friction wheel 28 and the disc 27 will move towards or away from the spindle 8 and the speed of rotation of the turntable will increase or decrease continuously respectively. The direction of movement, i.e., translationally right to left, or vice versa, clockwise or counterclockwise, will depend upon the direction in which the motor 31 is running. For a right handed operator using an outlet nozzle on the end of a flexible hose, the turntable should rotate in a clockwise direction as seen from above. In this case the motor should drive the friction wheel so that it rotates in an anticlockwise direction as seen from the right in FIG. 3. The operator will then start to deposit a spiral configuration of product adjacent to the centre of a confection on the turntable and the turntable with the confection will rotate in a clockwise direction as seen from above as the turntable moves from right to left along the guide. It will be appreciated that if the nozzle through which the whipped cream or other product is deposited is positioned substantially above the friction wheel 28, the confection on the turntable passing that point will always be passing the nozzle at the same linear speed and consequently if the product is extruded from the nozzle at a constant flow rate the product will be deposited on the confection in a spiral configuration of constant linear weight. This applies of course irrespective of whether the product is deposited through a hand-held nozzle at the end of a flexible hose or through a fixed nozzle.

For decorating a subsequent confection it will be necessary to bring the turntable back to its right hand limiting position. This may be achieved by reversing the motor or by manipulating the operative end of the control rod downwards and then from right to left again. Appropriate positioning of the tabs 41 and 42 makes it a simple matter to bring the turntable back to an intermediate starting position if it is not desired to bring the spindle back fully to the right hand end of its guide.

The controls for the motor 31 may be mounted in a control panel in the front wall of the housing cover 6, although a stop-start switch for the motor may be controlled by an operator's foot pedal.

The lip 7 is so shaped that with the turntable 9 removed an elongate cover can be placed over the slot surrounded by the lip 7 and the housing sterilised with liquid without any of the liquid entering the housing.

The turntable device is useful in any of the ways described in the parent application. FIG. 4 is similar to FIG. 1 of my copending U.S. Pat. application Ser. No. 68,103, and shows but one example in which a cream whipping machine 45 is mounted on a bridge 46 supported on a stainless steel trolley 47. The machine 45 is advantageously of the type shown and described in my U. S. Pat. No. 3,606,266 and reference is made thereto to complete this disclosure. The turntable device is mounted on a bridge 48 also mounted on the trolley 47. A confection 49 is shown having whipped cream deposited on it in a spiral or concentric ring configuration by means of a hand-held bag 50 having a star nozzle 51, the bag being connected directly to the machine outlet through a flexible hose 52.

The hose 52 and bag 50 could equally well be replaced by a rigid outlet nozzle or by a nozzle carried by a fixed support and connected to the machine by a hose. Similarly the machine 45 and turntable device could be integrated into a manually or automatically programmed production line incorporating conveyors or other equipment.

While a preferred embodiment of the invention has herein been illustrated and described, this has been done by way of illustration and not limitation, and the invention should not be limited except as required by the scope of the appended claims.

I claim:

1. A turntable device for use with a machine for producing whipped cream or other stiff, fluent, aerated emulsion food products, and discharging them through at least one outlet nozzle; the device comprising: a turntable 9 having a surface for supporting a confection, means mounting the turntable for rotation about a generally vertical axis 8, a linear guide 23, 24 constraining the turntable 9 for movement to and fro linear and drive means including at least one friction wheel 28 for driving the turntable 9 in two alternative modes including a first mode in which the axis of rotation 29 of the friction wheel 28 is disposed perpendicular to said vertical axis 8 and at a fixed radial position from said vertical axis and rotates the turntable at a constant speed without moving along the linear guide, and a second mode in which the axis of rotation of the friction wheel is disposed at an angle to said perpendicular to produce a reaction which moves the turntable along the inear guide so that the friction wheel has a continuously varying radial position relative to said vertical axis and the speed of rotation of the turntable surface also continuously varies.

2. A device according to claim 1, in which the friction wheel which drives the turntable in the first mode is fixed in position relatively to the guide, and including means for holding the turntable in a selected position along the linear guide.

3. A device according to claim 1, including means for disconnecting the drive means so that the turntable may be turned freely by hand.

4. A device according to claim 1, in which there is only a single friction wheel which drives the turntable in both modes; and the single friction wheel and vertical axis of the turntable being relatively adjustable between a first position corresponding to the first mode of operation, and a second position corresponding to the second mode of operation.

5. A device according to claim 4 including a spindle defining said vertical axis, means for mounting the turntable at the upper end of the spindle, a housing having an upper surface disposed below the turntable and an opening in said upper surface through which the spindle projects, a disc inside the housing engaged with the friction wheel and mounted for rotation with the spindle.

6. A device according to claim 5, including a carriage on which the linear guide is mounted, a control member which extends through a wall of the housing so that one end of the control rod is manipulable externally for moving the carriage in a horizontal direction perpendicular to the length of the linear guide; a pivotal linkage on which the spindle is carried for movement between said first and second positions, and a follower associated with the spindle for engaging the guide to move the spindle as the carriage is moved.

7. A device according to claim 6, in which the linear guide is parallel to the housing front wall, the control member extends substantially horizontally through the front wall of the housing and has inner and outer ends, a universal joint is connected to the control member between its ends and to the carriage, the inner end of the control member being operatively engaged with the turntable spindle, whereby when the outer end of the control member is moved to the left or right, the turntable spindle and turntable is moved to the right or left respectively.

8. A device according to claim 7, in which the spindle is raised to disconnect the disc from the friction wheel when the outer end of the control member is depressed.

9. A device according to claim 7 including locating means adjacent the outer end of the control member to limit movement of the control member in a selected range of positions along the front wall of the housing and hence to limit the turntable in a selected range of positions relatively to the linear guide.

10. A turntable device comprising: a housing, a turntable disposed above the housing and having a surface for supporting a confection, an upright spindle on which the turntable is mounted for rotation therewith, a linear guide including two spaced rods operatively constraining the spindle for movement along the guide, and drive means for progressively moving the spindle along the guide while progressively changing the speed of rotation of the turntable.

11. A turntable device as set forth in claim 10 wherein the speed of rotation of the turntable varies between about 5 and 60 r.p.m.

12. A turntable device as set forth in claim 11 including a disc inside the housing parallel to the turntable and mounted on the spindle for rotation therewith, and wherein the drive means includes a friction wheel engaged with the disc at a slight angle to a line perpendicular to the spindle thereby producing a reaction which moves the turntable along the linear guide as the friction wheel rotates.

* * * * *

PO-1050
(5/69)

UNITED STATES PATENT OFFICE
CERTIFICATE OF CORRECTION

Patent No. 3,760,745           Dated September 25, 1973

Inventor(s) John MacManus

It is certified that error appears in the above-identified patent and that said Letters Patent are hereby corrected as shown below:

Column 6, line 57, "linear" should be -- horizontally, --;

Column 6, line 68, "inear" should be -- linear --.

Signed and sealed this 5th day of February 1974.

(SEAL)
Attest:

EDWARD M. FLETCHER, JR.           RENE D. TEGTMEYER
Attesting Officer                 Acting Commissioner of Patents